United States Patent [19]

Ebner et al.

[11] 3,813,086

[45] May 28, 1974

[54] DEVICE FOR AERATING LIQUIDS

[75] Inventors: Heinrich Ebner, Bonn-Ippendorf; Anton Enenkel, Bonn-Roettgen, both of Germany

[73] Assignee: Firma Heinrich Frings, Bonn, Germany

[22] Filed: June 5, 1972

[21] Appl. No.: 259,693

Related U.S. Application Data

[63] Continuation-in-part of Ser. No. 828,695, May 28, 1969, abandoned, which is a continuation-in-part of Ser. No. 640,618, May 23, 1967, abandoned, which is a continuation-in-part of Ser. No. 625,232, March 22, 1967, abandoned.

[30] Foreign Application Priority Data

Apr. 5, 1966   Austria .......................... 3217/66

[52] U.S. Cl. ................................................ 261/93
[51] Int. Cl. ................................................ B01f 3/04
[58] Field of Search .................... 261/87, 93, 64 R

[56] References Cited
UNITED STATES PATENTS

| | | | |
|---|---|---|---|
| 2,226,958 | 12/1940 | Zahm et al. | 261/64 |
| 2,928,665 | 3/1960 | Epprecht | 261/87 |
| 2,944,802 | 7/1960 | Daman | 261/87 |
| 2,997,424 | 8/1961 | Mayer | 195/49 |
| 3,066,921 | 12/1962 | Thommel et al. | 261/93 |
| 3,092,678 | 6/1963 | Braun | 261/87 |
| 3,327,851 | 6/1967 | Anderson | 261/87 |
| 3,445,245 | 5/1969 | Ebner | 195/49 |

FOREIGN PATENTS OR APPLICATIONS

| | | | |
|---|---|---|---|
| 724,791 | 7/1965 | Germany | 261/87 |
| 1,197,063 | 2/1955 | Great Britain | 261/87 |
| 1,366,173 | 6/1964 | France | 261/87 |

*Primary Examiner*—Frank W. Lutter
*Assistant Examiner*—Steven H. Markowitz
*Attorney, Agent, or Firm*—Norbert P. Holler

[57] ABSTRACT

A self-aspirating device for the aeration of liquids with atmospheric pressure air, and especially suited for use in tanks or like containers of large diameter and height, is disclosed. The device includes a hollow rotor and a surrounding stator, both mounted in the container near the bottom thereof. The rotor is supported by a relatively short extended motor shaft entering the container through the bottom thereof via a mechanical seal and connected with a high speed motor located directly below the container. The interior of the rotor is in communication with the ambient atmosphere via a stationary air intake pipe extending upwardly from the middle of the rotor and connected thereto in a liquid-tight manner with the aid of a labyrinth packing. The rotor has from 4 to 8 circumferentially spaced lateral vanes which may be rectilinear or curvilinear in outline, each vane being defined by two horizontal top and bottom surfaces and an intermediate vertical surface oriented non-radially away from the direction of rotation of the rotor, so that each vane is closed at its leading side facing in the direction of rotation and provides a vertical air outlet opening at its trailing side facing away from the direction of rotation. The maximum outer diameter of the rotor as measured at the locus of the outer vane edges is between 1/8 and 1/15 of the inner diameter of the container. The stator includes an upper ring and a lower ring both concentric with the rotor and extending laterally outwardly of the latter toward the wall of the container, and from 12 to 36 vertical guide plates disposed between the rings and inclined non-radially of the rotor in the direction of rotation of the latter, the locus of the innermost edges of the guide plates, as well as the inner edges of the stator rings, being at a 0.5 to 3 mm spacing from the locus of the outer edges of the rotor vanes. The aerating device according to this invention is able to aspirate as much as 2,400 to 3,000 cbm of air per hour against the pressure of a 4 m high liquid column with very moderate power consumption, and to provide air bubbles of the finest size uniformly distributed in the liquid so as to lead to an extremely high quality of the aeration. This abstract is not to be taken as a complete exposition or as a limitation of the present invention, however, the full nature and extent of the invention being discernible only by reference to and from the entire disclosure.

11 Claims, 9 Drawing Figures

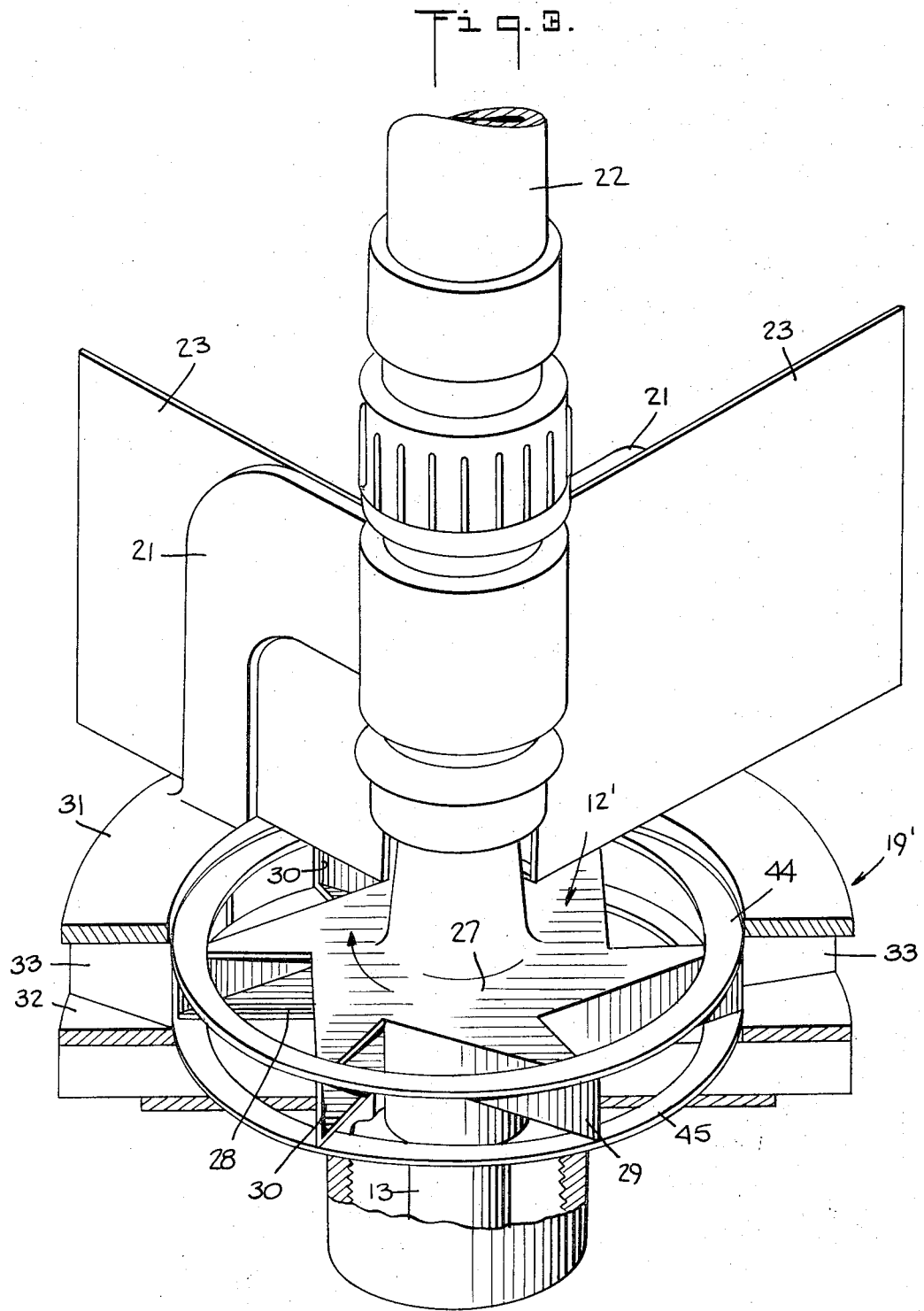

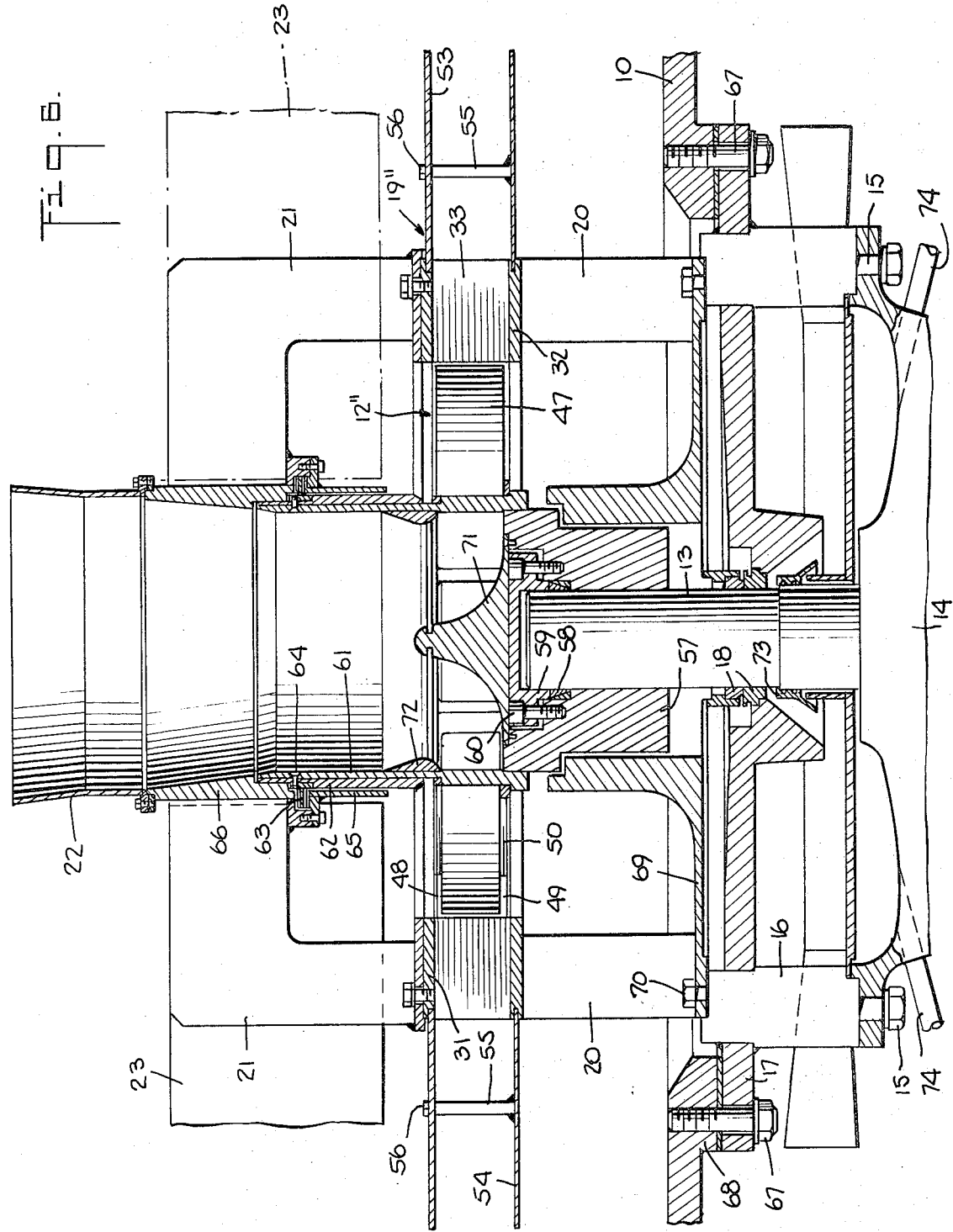

DEVICE FOR AERATING LIQUIDS

The instant application is a continuation-in-part of our prior copending application Ser. No. 828,695 filed May 28, 1969 and now abandoned, which is a continuation-in-part of our prior application Ser. No. 640,618 filed May 23, 1967 and now abandoned, the latter in turn being a continuation-in-part of our prior application Ser. No. 625,232 filed Mar. 22, 1967 and now abandoned.

This invention relates to a device for aerating liquids, and in particular to such a device which is capable of self-aspirating air and of distributing it uniformly in fine bubbles throughout the entire body of liquid to be aerated.

As pointed out in our aforesaid prior applications, most known liquid-aerating devices are designed to work primarily as agitators operating in combination with a blower or compressor furnishing precompressed air to be blown into the liquid. These devices, however, though mixing the blown-in air with the liquid, do not enable a good uniformity in bubble size and a uniform distribution of the bubbles in the liquid to be achieved. Such devices, moreover, require large volumes of air to carry out a given aeration process and consequently demand high power for both the blower and the agitator. At the same time, although some liquid-aerating devices which are capable of self-aspirating air are known, very few of these have been capable of operation on a technical (i.e. commercial or production level) scale, which means to afford a distribution of at least about 40 cbm of air per hour in a tank or container with a liquid column more than 3 m high. An aerating device which is capable of operating on such a scale is disclosed in British Patent No. 724,791. With an aeration device of this type, it is possible to distribute air in a body of a liquid of 3.0 m height with a specific power consumption of 1.2 – 1.5 kwh per 10 cbm of air, and to achieve, in a container having an inner diameter of 3.0 m, a uniform aeration with 50 cbm of air per hour.

In particular, of the forms of the apparatus shown in British Patent No. 724,791, the one which produced the best results utilized an aerating device which includes a six-vaned impeller or rotor provided with six openings for egress of air facing away from the direction of rotation and with six non-radial impeller surfaces facing in the direction of rotation. The rotor is connected to a long, hollow, upwardly extending drive shaft and is surrounded by a stator having an upper ring and a lower ring and eight non-radially oriented vertical guide plates between the two rings, each of the guide plates being disposed so as to make an angle of 30° with a radial plane which includes the outermost edge of that guide plate. The locus of the innermost edges of the guide plates is spaced about 6 to 7 mm from the locus of the outermost edges of the impeller vanes, and the upper and lower rings of the stator extend inwardly over and cover a substantial portion, on the order of about 50 percent, of the impeller from both above and below.

It is the principal object of the present invention, therefore, to provide a novel and improved aerating device for use in an apparatus of the type disclosed in British Patent No. 724,791, by means of which to enable the same to aerate up to 100 cbm of liquid with up to 3,000 cbm of air per hour both uniformly and with air bubbles of the smallest possible size, and with the lowest possible power comsumption.

Generally speaking, the objectives of the present invention are attained by an improved self-aspirating aerating device, for use in a vertically disposed cylindrical tank or container having a predetermined internal diameter, which device, according to the basic aspects of the invention, comprises (1) a relatively short rotatable drive shaft extending into the container from below; (2) a motor mounted just below the container for driving the shaft at high speed in a predetermined direction of rotation; (3) a hollow rotor carried by the shaft within the container and near the bottom of the latter, the rotor having two vertically spaced, horizontal surfaces and 4 to 8 circumferentially spaced, imperforate, laterally projecting, vertical impeller surfaces intermediate said horizontal surfaces to define a like number of vanes, and the rotor further having a maximum outer diameter, i.e. the diameter of the locus of the apices of the vanes, of between ⅛ and 1/15 the internal diameter of the container; (4) a stationary air intake pipe communicating with the interior of the rotor for aspiration of air from the atmosphere, the air intake pipe extending into the container from above, and the connection between the rotor and the pipe being sealed by a labyrinth packing; (5) the vanes of the rotor being arranged to define at the trailing side of each vane a vertically disposed outlet opening for egress of air therefrom in a direction opposite to the direction of rotation of the rotor; (6) each of the vertical impeller surfaces being inclined non-radially of the rotor away from the direction of rotation at an angle between about 30° and 70° with respect to a radial plane including the outer edge of that vertical impeller surface, i.e. the vane apex, so that each vertical impeller surface trails a respective one of the outlet openings in the direction of rotation and forms with that preceding outlet opening an impeller chamber which is open from above and below for admitting liquid thereinto to be mixed with the air flowing out from the rotor interior through that outlet opening; and (7) a stator surrounding the rotor and including an upper ring and a lower ring and 12 to 36 vertical guide plates arranged between the stator rings for directing the mixture of liquid and air outwardly toward the periphery of the container; (8) each of the vertical guide plates being inclined non-radially of the rotor in the direction of rotation thereof at an angle between about 25° and 35° with respect to a radial plane including the inner edge of that guide plate; (9) the locus of the inner edges of the stator guide plates and the inner edges of the stator rings being at a spacing of 0.5 to 3 mm from the locus of the outer edges of the vertical impeller surfaces of the rotor, the inner diameters of both the stator rings thus being greater by 1 to 6 mm than the maximum outer diameter of the rotor; and (10) the outer diameters of both stator rings being between about 1.5 and 2 times the maximum outer diameter of the rotor, the rings thus having a radial width between about ¼ and ½ the maximum outer diameter of the rotor.

The technological advances afforded by the so-characterized basic aeration device of the present invention will be readily comprehended from the following considerations.

In order to create the suction necessary to aspirate the required large volumes of free non-compressed air from the atmosphere, the rotor must rotate at relatively high speed. For the purposes of the present invention it is contemplated to use rotor speeds above 1,000 rpm and preferably between about 1,400 and 1,800 rpm. For the type of unit disclosed in British Patent No. 724,791, the construction thereof for aspiration of more than 50 cbm of air per hour would necessitate the provision of a long and powerful hollow drive shaft. Stainless steel is, however, essentially the only construction material which can be used for this shaft. The relative weakness of this material thus makes such a construction impractical from a purely mechanical point of view. The present invention avoids and overcomes this problem by utilizing a rotatable, relatively short, extended motor shaft reaching into the container from below, with the rotor being carried by this shaft in the container near the bottom thereof and driven by a motor from below, and a mechanical seal between the shaft and the container being provided to avoid loss of liquid. The broad principle of having a rotor of a self-aspirating aeration device driven from below via a drive shaft supporting the rotor is per se known from the disclosures of French Patent No. 1,366,173, but that device utilizes a rotor and stator of radically different constructions than the rotor and stator of the device according to the present invention and, as disclosed, is dependent on the presence of a stuffing box between the drive shaft and the container and of a special coupling between the motor shaft and the drive shaft. The device of the said French patent, moreover, cannot be enlarged for use in relatively higher capacity units such as contemplated by the present invention without the provision of special bearings for the drive shaft.

Another advantage of the device according to the present invention is that, with the rotor driven from below and connected above to a stationary air intake pipe extending from the atmosphere into the container, and with the connection of the rotor to the air pipe being sealed by a labyrinth packing, the device is able to operate without any liquid being sucked into the interior of the hollow rotor, an occurrence which, if permitted, would result in an increase in power consumption and in a decrease of the amount of aspirated air.

Concomitantly, tests have shown that there exists an optimum range of values for the maximum outer diameter of the rotor as hereinbefore defined in relation to the inner diameter of the container for the liquid to be aerated. The prior art self-aspirating liquid-aerating apparatuses of which we are aware, including those of the above-mentioned British and French patents, have universally used rotors of a large outer diameter in relation to the container diameter and operated at a relatively low speed of rotation (expressed in rpm). The apparatus according to the present invention departs from that concept and utilizes a rotor having a relatively small maximum outer diameter and running at a relatively high rotational speed. Best results have been obtained with a rotor the maximum outer diameter of which is between ⅛ and 1/15 the inner diameter of the container and which is run at a speed above 1,000 rpm and preferably between about 1,400 and 1,800 rpm. Such an arrangement has led to both lower power consumption, on account of the smaller rotor mass to be driven and the lower friction between its surfaces and the liquid, and a much more uniform distribution of the air bubbles within the liquid.

The attainment of the best possible degree of uniformity of the air distribution is a matter of great importance, of course. In this context, "uniformity" means that near the bottom of the container, in every part of the cross-section thereof, substantially the same amount of air in the form of equally sized bubbles is rising upwardly. The misture of air and liquid emanating from the rotor must thus be propelled outwardly sufficiently to reach the inner wall of the container. It must be remembered, however, that whereas, due to the turbulence created in the area between the rotor and the container wall, the mixture in that area will continuously lose some liquid and air, the same will not hold true for the relatively stable area immediately above the rotor. It is essential, therefore, in order to attain as uniform an air distribution as possible, that the cross-sectional area of the rotor must be small compared to the cross-sectional area of the container. For a rotor having a diameter falling within the above mentioned limits, the areal ratio thus will be between 1/64 and 1/225. Nowhere in the prior art of which we are aware has the importance of this relation been either mentioned or recognized.

Still another advantage of the aeration device according to the present invention derives from the characteristics of the stator construction in the manner aforesaid. These characteristics were determined on the basis of many tests aimed at discovering the critical facets of the stator with respect to the attainment of as uniform an aeration as possible with finest size bubbles at the lowest feasible power consumption. Thus, in the apparatus of British Patent No. 724,791, the stator surrounding the rotor consists of two annular plates or flat rings and eight vertical guide plates therebetween, the guide plates being secured at the outer edges thereof to respective staybolts and each being oriented non-radially of the rotor at an angle of 30° with a radial plane including the associated bolt, i.e. the outer edge of that guide plate. This, of course, means that at its inner edge each such guide plate makes an angle of as much as 45° to 50° or more with a radial plane which includes that inner edge. At the same time, the locus of the inner edges the vertical guide plates is at a 6 to 7 mm spacing from the locus of the outer edges of the vanes of the rotor, i.e. the diameter of the locus of the inner edges of the vertical guide plates is 12 to 14 mm greater than the maximum outer diameter of the rotor. In the device of the present invention, on the other hand, a higher number of vertical guide plates at a substantially lesser spacing from the rotor is used in the stator and has been found to be an important requirement for a more uniform distribution of the air-liquid mixture, the optimum conditions being reached when a stator with 12 to 36 vertical guide plates inclined as herein specified and at a 0.5 to 3 mm spacing from the rotor is combined with a rotor having 4 to 8 air outlets on the trailing sides of the rotor vanes. In particular, the vertical stator guide plates are arranged each at an angle of 25° to 35° with a radial plane including the inner edge of that guide plate.

It should be noted that it is important to determine the magnitude of this angle at the inner edges of the vertical guide plates, because it is there that the mixture of air and liquid emanating from the rotor is initially incident on and deflected by the guide plates. In the apparatus according to British Patent No. 724,791, on the other hand, the much greater angle at the inner edge of each guide plate makes for too much interference with the outward flow of the mixture. The orientation of the guide plates as in the device according to the present invention directs the air-liquid mixture more efficaciously toward the wall of the container and, therefor, separates it from the rotor in a more rapid fashion. In effect, this enables the amount of air sucked-in by the same rotor to be materially increased without increasing the power consumption.

Another very important point is the aforesaid relatively close spacing of the locus of the inner edges of the vertical guide plates (0.5 to 3 mm) from the locus of the outer edges of the vanes of the rotor. This also helps to increase the suction developed and therewith the amount of air aspirated by the aerator without a commensurate increase in power consumption.

A further significant consideration is that the liquid entry openings of the chambers formed by the vertical non-radial impeller surfaces and the preceding air outlets of the rotor, into which chambers liquid enters from both above and below and in which the liquid and air are mixed, are adapted to the respective operating conditions, e.g. the amount of air to be aspirated, the volume of liquid to be aerated, the height of the liquid level in the container, the diameter of the container, etc. In the apparatus according to British Patent No. 724,791, these rotor chambers are covered to a great extent by the radially inwardmost sections of the horizontal stator rings. Although this may be permissible where the rotor to container diameter ratio is relatively large, it is clearly disadvantageous where the rotor diameter is relatively small compared to the diameter of the container, as in the device of the present invention, since in that case more liquid must be spread out by the rotor, which means that more liquid must also flow into the rotor. In the present device, therefore, the rotor or impeller chambers are not covered by the stator rings at all. The chambers are either totally open or uncovered, and may even be enlarged somewhat by a suitable recessing of the top and bottom surfaces of the vanes, or the tops and bottoms of the chambers may be covered to a limited extent by an upper ring and a lower ring suitably affixed, respectively, to the said top and bottom surfaces of the vanes at the outermost edge region of the rotor. Preferably, these rings will have an inner diameter between about 10 and 20 percent less than their outer diameter. In this way, an additional control over the uniformity of the air bubble distribution and the power consumption can be achieved.

It is also within the contemplation of this invention that the rotor may be constructed with curvilinear vertical impeller surfaces each forming at every generatrix thereof along its length an angle between 40° and 70° with a vertical radial plane including that generatrix. The significance of this feature is that, in scaling up the aerator construction for units capable of aspirating more than 1,000 cbm of air per hour against a 4 m liquid height, an increase in the diameter of the rotor is unavoidable, even though the speed of rotation is to remain the same. This would mean that for a rotor with rectilinearly contoured vanes, the acute angles between the vertical impeller surfaces and the radial planes at their outer edges may become too small. An unnecessarily fast rotation of the liquid-air mixture and an increased power consumption would be the result. This added increase is not desirable, of course, as a certain increase in power consumption with increasing rotor diameter is already unavoidable anyway. The curving of the vertical impeller surfaces as aforesaid provides a solution to this problem, in that it becomes possible to enlarge the device with only a moderate increase in specific power consumption per cbm of air.

In an aeration device of the present invention it is furthermore contemplated, as previously stated, that the impeller chambers of the rotor may be enlarged somewhat. This is effected by extending them beyond the vertical radial planes of the rotor passing through the outer edges of the vertical impeller surfaces. Again it must be kept in mind that scaling up the rotor means an increase in specific power consumption with increasing diameter of the rotor. The greater diameter of the rotor is at least partially necessitated by the required increase in liquid inflow into the rotor chamber, in order to create a suction large enough to aspirate the high amount of air. This task can, however, be taken over at least in part by the enlarged rotor chambers. In this way it becomes possible to use a somewhat smaller diameter rotor for a certain amount of air and thereby to achieve a better, i.e. lower, specific power consumption.

According to yet another aspect of the invention, it is contemplated that the upper and lower stator rings may be increased in width, for example by means of added horizontal guide sheets, so as to impart to the final stator ring structure an outer diameter greater than two times the maximum outer rotor diameter and preferably between about three and five times the maximum outer diameter of the rotor (i.e. a radial width of about one to two times the maximum rotor diameter). Tests of this type of stator construction have shown that the use of such extended horizontal guide sheets increases the amount of aspirated air by 20 to 40 percent with no or only a small increase in power consumption compared to the same construction without these guide sheets. It becomes possible, therefore, through the utilization of such added guide sheets or otherwise correspondingly enlarged stator rings, to construct very large units capable of aspirating 2,400 or more cbm of air per hour with the same specific power consumption as smaller units constructed without such guide sheets or enlarged stator rings but aspirating only 100 cbm of air per hour. The enormous technological advance achieved through this construction thus will be readily apparent. Moreover, using it in small aerators gives an even further decrease in specific power consumption, which has not been attainable so far. Finally, combining the extended horizontal guide sheets with the other features mentioned herein before, makes it possible to aspirate an amount of air which corresponds to almost 100 percent of the theoretically possible value.

The foregoing and other objects, characteristics and advantages of the present invention will be more clearly understood from the following detailed description thereof when read in conjunction with the accompanying drawings, in which:

FIG. 3 is a fragmentary isometric view, partly in section, of an aerator according to a somewhat modified embodiment of the present invention;

Figure 1:
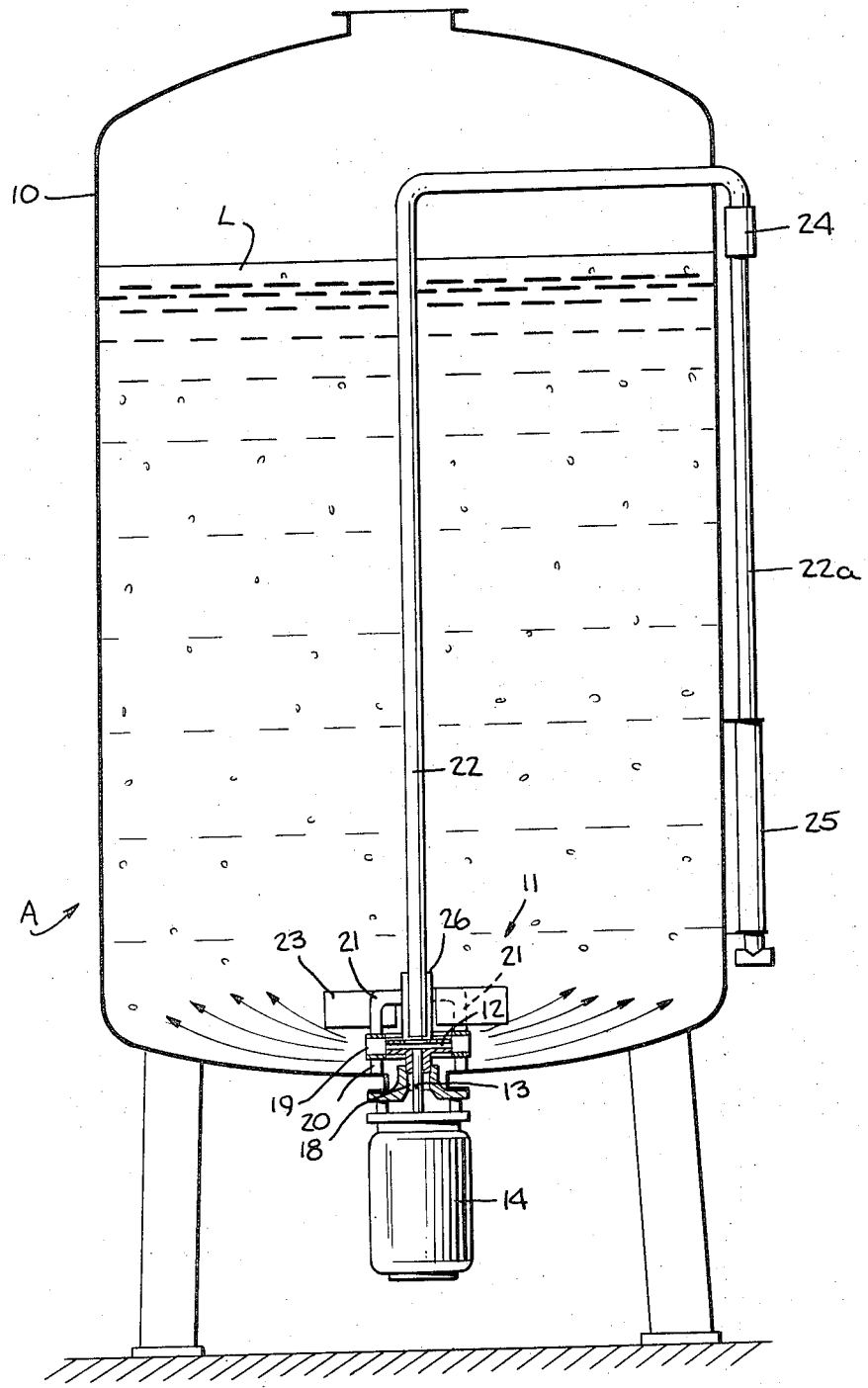
FIG. 1 is a schematic elevational view of a liquid aerating apparatus utilizing an aerating device according to the present invention, some parts being shown in section.
Figure 7:
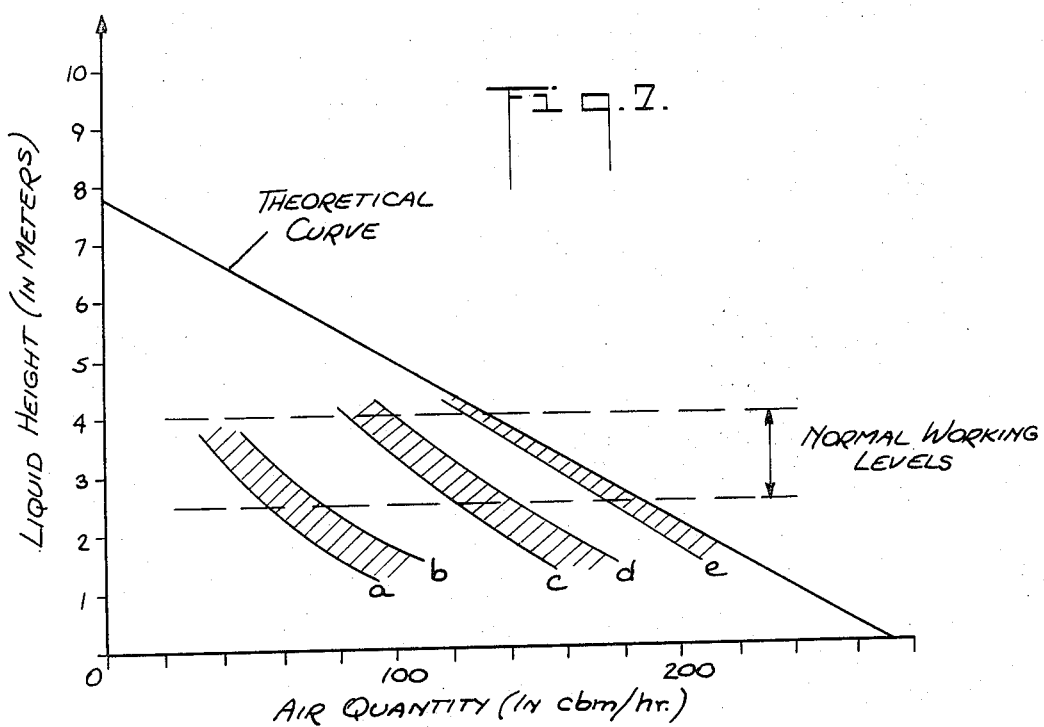
Figure 5:
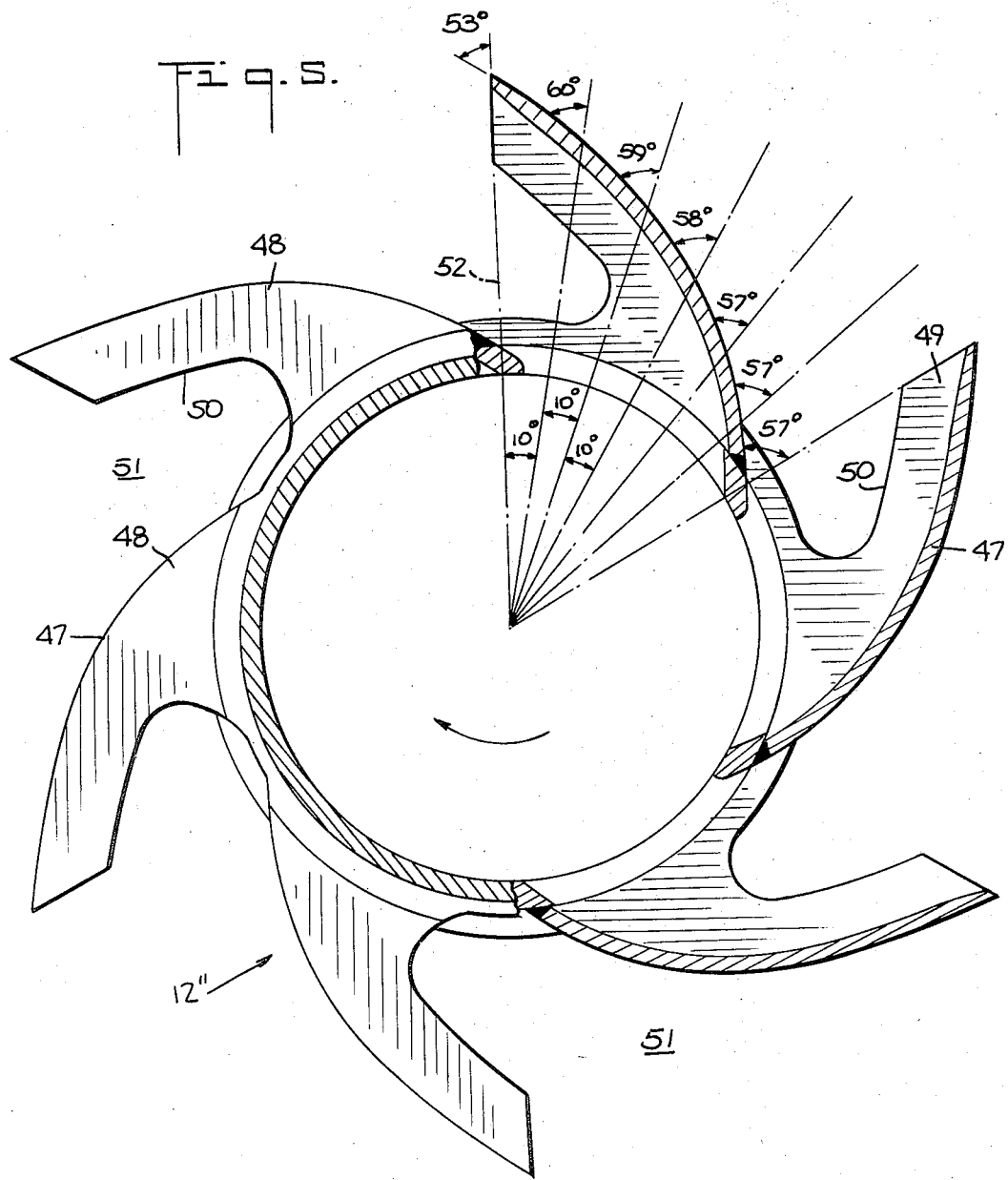
FIG. 5 is a partly sectional plan view of a rotor according to another embodiment of the present invention.
Figure 8:
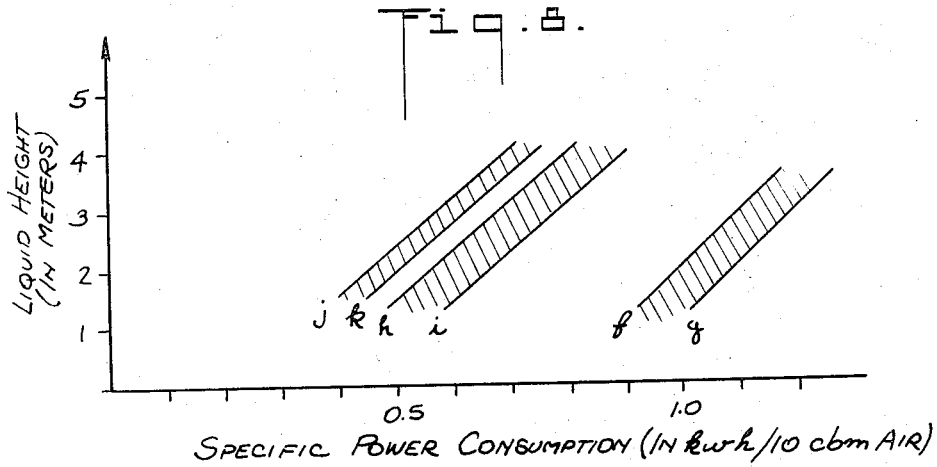

FIG. 6 is a fragmentary vertical sectional view of the lower portion of an aerating apparatus according to the present invention, the view being on a larger scale than FIG. 1 to show certain details, and the aerating device being shown, by way of example, as including a rotor of the type shown in FIG. 5 and a stator with enlarged upper and lower rings; and FIGS. 7 and 8 are graphs representing comparative plots of certain operational characteristics of the aerating devices of the present invention and of British Patent No. 724,791.

Referring now to the drawings in greater detail, the aerating apparatus A shown in FIG. 1 comprises a tank or container 10 for the liquid L to be aerated, and an aerating device 11. The device 11 includes a hollow rotor 12 mounted near the bottom of the container 10 on a short, vertical, rotatable shaft 13 which extends into the container from below through the bottom of the latter and is an extension of the shaft of a high-speed electric motor 14. The motor is fixedly secured to the bottom of the container, and the shaft is maintained in liquid-tight relation to the container by means of a mechanical seal 18. The rotor 12 is surrounded by a stator 19 fixedly mounted on the bottom of the container, for example by means of suitable brackets 20. The stator carries a plurality of upper brackets 21 which provide the mounting for the bottom end of an air intake pipe 22 and also support a plurality of stationary vanes or blades 23 to prevent rotation of the liquid. The air intake pipe 22 extends upwardly within the container and out of the same near the top, being provided in its outer section 22a with a device 24 for keeping constant the amount of aspirated air in dependence on the level of the liquid being aerated, and a rotameter 25 for measuring the amount of aspirated air. The bottom end of the air intake pipe 22 is in communication with the interior of the hollow rotor 12, a labyrinth packing 26 preventing entry of liquid into the rotor.

Figure 2:
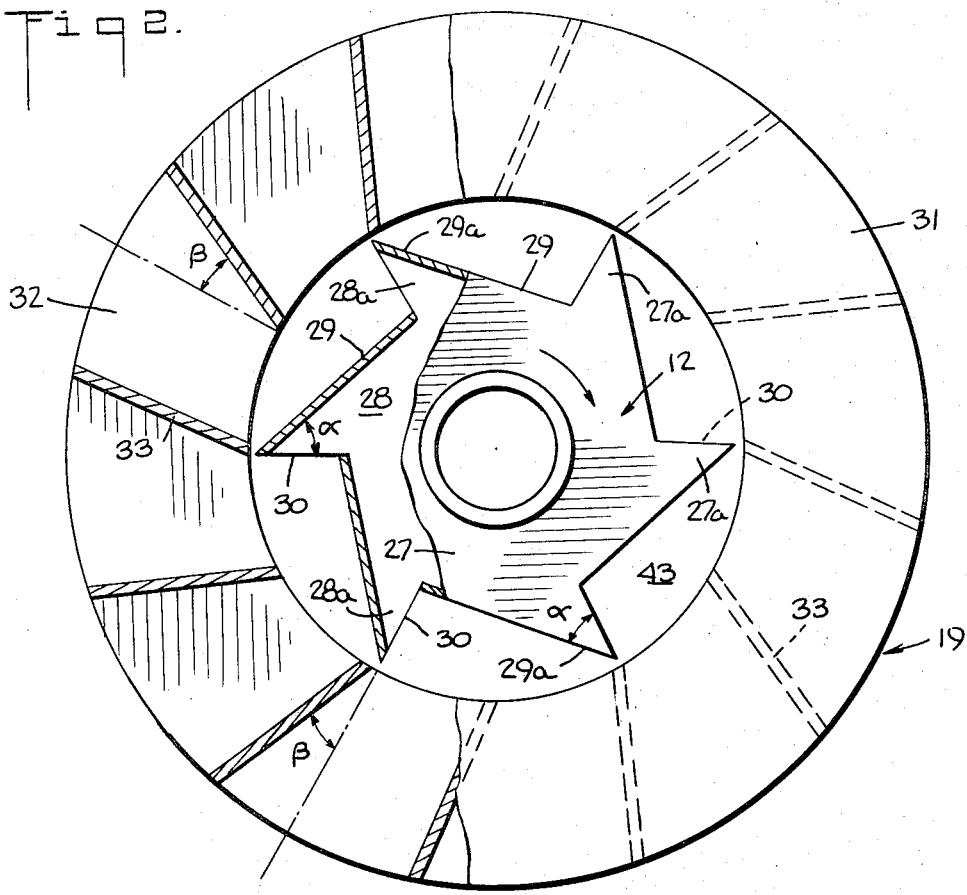
FIG. 2 is a partly sectional plan view of the rotor and stator of an aerating device according to one aspect of the present invention.

Referring now to FIG. 2, the rotor 12 there shown comprises a pair of vertically spaced upper and lower horizontal surfaces 27 and 28 and a plurality (six are shown but the number, as stated, may be between four and eight) of imperforate vertical impeller surfaces 29 oriented non-radially of the rotor away from the direction of rotation thereof. The rotor is generally zig-zag shaped in outline, and the orientations of the vertical impeller surfaces 29 are such that the apex angles $\alpha$ of the rotor vanes, i.e. the acute angles between the vertical impeller surfaces and the respective vertical radial planes which include the outer edges of the said surfaces, are between about 30° and about 60°. Normally, a rotor in a larger diameter container will have a smaller vane apex angle than a rotor in a smaller diameter container. Each vane of the rotor 19, being defined by an outermost portion 29a of the vertical surface 29 and corresponding outermost portions 27a and 28a of the horizontal surfaces 27 and 28, thus provides an air outlet opening 30 facing away from the direction of rotation of the rotor.

The stator 19 which surrounds the rotor 12 comprises a pair of vertically spaced upper and lower annular plates or rings 31 and 32 and a plurality (12 are shown but the number, as stated, may be between 12 and 36) of vertical guide plates 33 secured to the upper and lower plates between the latter and oriented non-radially of the rotor in the direction of rotation of the same. The orientations of the vertical guide plates 33 are such that each makes an angle $\beta$ of between 25° and 35° with a radial plane which includes the inner edge of that guide plate. The locus of the inner edges of the vertical guide plates 33 essentially coincides with the inner edges of the upper and lower rings 31 and 32 and is spaced between 0.5 and 3 mm from the locus of the outer edges of the vanes of the rotor. The larger spacings in this range normally will be of advantage if the liquid to be aerated contains small particles of solids.

Figure 1A:
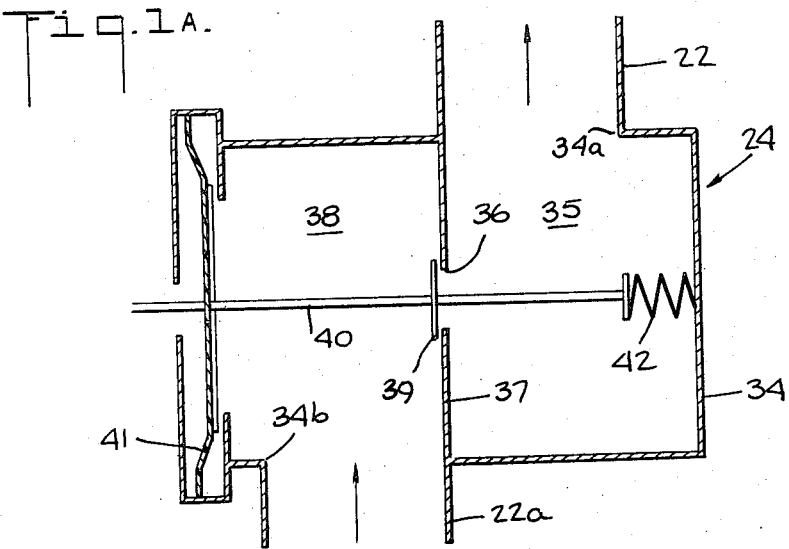
FIG. 1A is a diagrammatic illustration of an air flow controller for use with the aeration apparatus shown in FIG. 1.

The device 24 for automatically keeping constant the amount of air used in an aeration process comprises (FIG. 1A) a housing 34 defining an enclosed space 35 which communicates with the air intake pipe 22 at 34a. An opening 36 in an interior partition 37 of the housing establishes communication between the space 35 and a second space 38, the opening 36 being controlled by a valve or throttle plate 39 carried by a rod 40 extending through the housing 34. The rod 40 is connected at one end to a diaphragm 41 and at its other end is acted upon by a spring 42 which biases the throttle plate away from the opening 36. The space 38 communicates at 34b with the air intake pipe section 22a. Thus, if in the course of an aeration operation the suction should happen to increase, which may occur when the liquid level in the container is lowered, the diaphragm 41 will move the throttle plate 39 toward the opening 36, while if the suction should happen to decrease, which may occur when the height of liquid level in the container rises, the throttle plate 39 is moved away from the opening 36 by the spring 42. In this way, the amount of aspirated air is kept constant, in spite of variations in the intensity of the suction, so that both the size of the air bubbles and their distribution over the cross-section of the container remain uniform.

It will be understood, therefore, that as the rotor 12 rotates at high speed and creates a vacuum in its hollow interior, air aspirated through the intake pipe 22 from the ambient atmosphere leaves the rotor through the outlet openings 30 thereof and enters the chambers 43 defined by the various vertical impeller surfaces 29 in conjunction with the respective immediately preceding outlet openings 30 and the imaginary cylinder constituted by the locus of the outer vane edges of the rotor. Simultaneously, of course, liquid enters the same chambers from both above and below the rotor. The resultant mixture of liquid and air bubbles is driven by the impeller surfaces 29 outwardly between the stator rings 31 and 32 and through the spaces between the vertical stator guide plates 33, the latter thus serving both to deflect the outwardly flowing liquid-air mixture somewhat and to effect a more intimate mixing. The stator guide plates 33 also ensure that the liquid-air mixture is correspondingly divided, so that as uniform as possible a distribution of the mixture over the entire cross-section of the bottom area of the container 19 is attained, and at the same time their angular orientation within the given range makes it possible to provide for any desired outward flow velocity of the mixture so as to ensure that the same will just reach the inner wall surface of the container 10. The quality of the aeration will thus be very high. Standards for gaging the aeration quality will be more fully described hereinafter.

Figure 4:
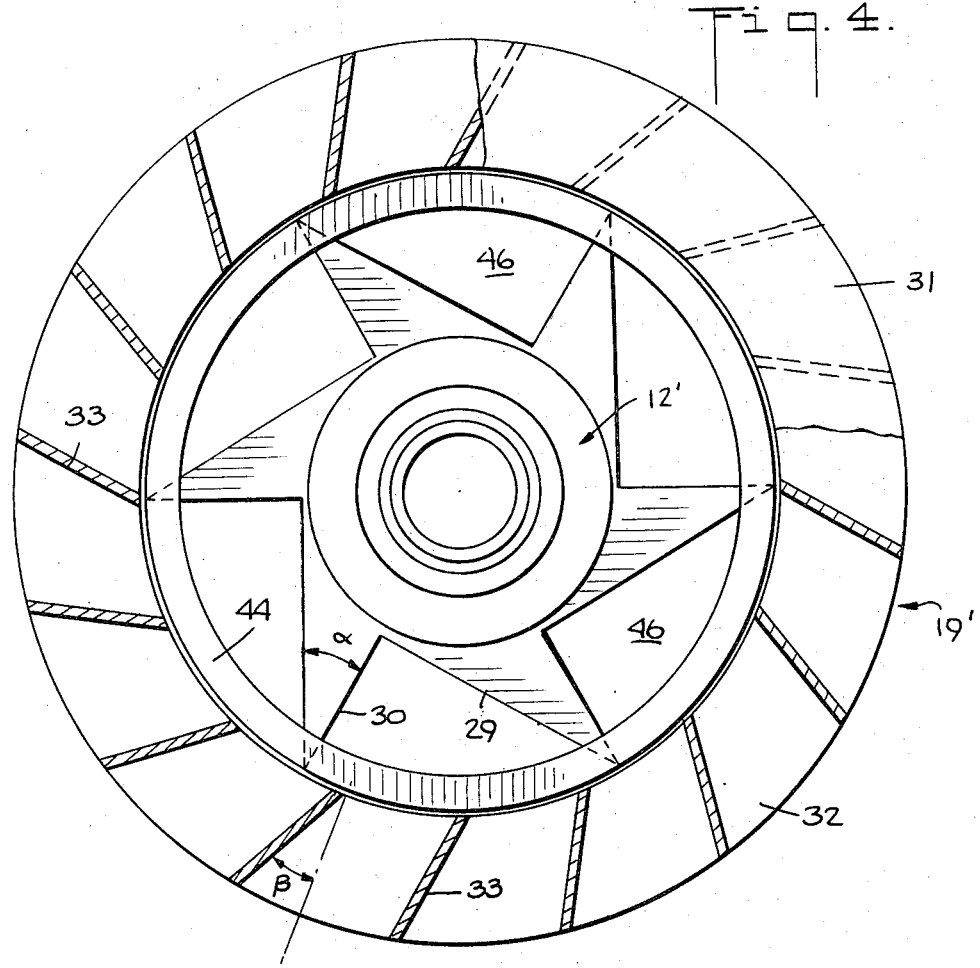
FIG. 4 is a partly section plan view of the rotor and stator of the aerating device shown in FIG. 3.

Referring now to FIGS. 3 and 4, the aerator structure according to another embodiment of the invention there illustrated includes a rotor 12' and a stator 19' which are basically the same as the corresponding elements shown in FIG. 2, differing therefrom only in that the stator is shown as having 16 vertical guide plates 33 between the horizontal annular plates or rings 31 and 32, and in that the rotor is provided in its outer peripheral region with a pair of rings 44 and 45 secured to its top and bottom surfaces, respectively. These rings are arranged to have their outer edges coinciding with the locus of the outer vane edges of the rotor, and their radial widths are such that their inner diameter is between about 10 and 20 percent smaller than their outer diameter. The rings 44 and 45 thus partly cover a limited outer region of each of the impeller or rotor chambers 46, thereby reducing the liquid entry thereinto without reducing the amount of air aspirated. A rotor such as 12' is found to have a lower specific power consumption than a rotor 12 for an aspiration of equivalent amounts of air, and conversely a rotor 12' will permit substantially larger quantities of air to be aspirated than a rotor 12 with the same or only little greater specific power consumption.

FIG. 5 illustrates a rotor 12'' according to yet another embodiment of the present invention. This rotor is shown as having six vertical impeller surfaces 47 (as before, the number may vary from four to eight), but these, in contrast to the rectilinear surfaces 29 of the rotors 12 and 12', are curved. In general, the curvature of each vertical impeller surface 47 is so chosen that at any generatrix thereof along its entire length, the impeller surface makes an angle between about 40° and 70° with a radial vertical plane which includes such generatrix. For the illustrated rotor 12'', the angles at seven intersections between equally spaced radial planes and the curved impeller surface 47 have been shown as being between 53° and 60°. In addition, the rotor 12'' is further shown as having its upper and lower horizontal impeller surfaces 48 and 49 provided with recesses or cutouts 50 extending forwardly from their trailing edges bounding the air outlet openings, thereby enlarging the impeller chambers 51 beyond the vertical planes 52 which pass through the outer edges of the vertical impeller surfaces 47. This modification (which could be incorporated in the rotors 12 and 12' as well) is particularly suited for use in larger diameter aerating units where it is necessary to have more liquid entering the impeller chambers at any given time. Although in theory such increased liquid entry could be obtained by utilizing an appropriately larger diameter rotor, recourse to that expedient is actually limited and possibly even counter-indicated for two reasons, by virtue of the fact that a sufficient increase in the rotor diameter would inherently entail an increase in the specific power consumption beyond acceptable limits, and by virtue of the fact that within the purview of the present invention the rotor diameter cannot be increased beyond a certain degree, i.e. to an extent where the ratio of the rotor diameter to the container diameter would exceed ⅛.

Referring now to FIG. 6, in accordance with yet another aspect of the present invention the operation of the aerating device may be still further improved through a modification of the stator thereof. Thus, the stator 19'' there shown includes the same basic elements as the stators 19 and 19', i.e. upper and lower annular plates or rings 31 and 32 and a plurality of non-radial vertical guide plates 33 therebetween. The stator 19'' is further provided, however, with a second pair of annular plates or rings 53 and 54 which are rigidly secured at their inner edges to the outer edges of the rings 31 and 32, respectively, and extend outwardly therefrom toward the walls of the container (not shown in FIG. 6). The plates 53 and 54 are connected to one another with the aid of spacer sleeves 55 and bolts 56. Preferably, the outer diameter of the stator extension plates (and thus of the entire extended stator ring structure) should be greater than twice but not more than about five times the maximum outer diameter of the rotor. The extension of the horizontal stator guide plates in the manner described will thus be seen to have the advantage of lowering, to an even greater degree than the plates 31 and 32 alone, the possibility of liquid which has just been aerated, i.e. which has just left the impeller chambers of the rotor, being drawn back into the impeller chambers without traveling as far as possible toward the container wall.

It should be noted that FIG. 6 illustrates in vertical cross section an aerator according to this embodiment of the invention using a curved-vane rotor 12'' such as shown in FIG. 5. As will be readily apparent, however, the stator 19'' could be used just as well with either of the rotors 12 and 12''.

FIG. 6 also shows some of the associated structural features of the aerating unit other than the rotor and stator in greater detail than FIGS. 1 and 3. Thus, the extended motor shaft 13 passing through the mechanical seal 18 is shown as having the hub 57 of the rotor seated on the shaft and secured thereto with the aid of locking rings 58 which are pressed down by a pressure flange 59 and screws 60. The hollow rotor is shown as extended upwardly in the form of a hollow cylinder 61. A second cylinder 62, press-fitted onto the cylinder 61, carries a small horizontal impeller 63 which is held in place by a screw 64 and during rotation of the rotor forms a labyrinth seal (designated 26 in FIG. 1) against the corresponding non-rotating upper stator parts 65 and 66 so as to prevent liquid from there entering the rotor. The motor 14 is shown as being secured to the container by being bolted through the intermediary of screws 15 to a motor support block 16 which in turn has a flange 17 bolted by screws 67 to a bottom flange 68 of the container. The stator is shown as mounted on a bottom plate 69, fixed on the support block 16 by means of screws 70, through the intermediary of the brackets z0. A cone 71 and a guide ring 72 are provided to facilitate the change of direction of the air stream. A drip ring 73 on the shaft 13 prevents liquid entry into the motor in case of a leak in the mechanical seal 18, with leaked fluid being drawn off via drain pipes 74.

For a thorough understanding of the present invention, the basic underlying principle which must be kept in mind is that the dynamic pressure of a mixture of aspirated air and liquid spread out by a rotor is in equilibrium with the static pressure of the liquid height to be aerated. In other words, the spread-out mixture can contain only that quantity of air which is permitted by this equilibrium at the spreading velocity due to the rotor and stator construction. Referring now to the graph of FIG. 7, it is known from theoretical considerations (see the "theoretical curve") that any given aeration device which, for a given liquid height above the device, can aspirate a certain amount of air per unit of time, can aspirate greater amounts of air as the submergence of the rotor is lessened, i.e. under lower heights of liquid. With the theoretical curve taken as the ideal, an aerating device according to British Patent No. 724,791 tested at normal working levels, generally under a liquid height between about 2 and 4 m, was able to aspirate only relatively low amounts of air, the values falling into the region between the curves $a$ and $b$. By way of contrast, aerating devices according to the present invention and utilizing rotors such as are shown in FIGS. 2, 3-4 and 5 of this application were able, when similarly tested, to aspirate considerably higher quantities of air, the values falling into the region between the curves $c$ and $d$, while with an aerating device including extended horizontal stator plates or rings as shown in FIG. 6, the values of air aspirated by the device approximated the theoretical values, falling into the region between the curve $e$ and the theoretical curve. A comparison of the data plotted in FIG. 7 in the range of the normal working levels clearly shows the advances afforded by the present invention in terms of cbm of air per hour.

FIG. 8, on the other hand, is a plot of the specific power consumption of the same three types of aerating devices in kwh per 10 cbm of air in dependence on degree of the submergence of the device. The test values for the device according to British Patent No. 724,791 here fell into the region between the curves $f$ and $g$. On the other hand, the values for devices utilizing rotors according to FIGS. 2, 3-4 and 5 fell into the region between the curves $h$ and $i$, and the values for such a device but using extended stator rings according to FIG. 6 fell into the region between the curves $j$ and $k$. The increase in specific power consumption which normally occurs with increasing liquid height is clearly shown in FIG. 8, as are the striking advances afforded by the present invention in reducing specific power consumption.

It will be clear, of course, that whereas FIGS. 7 and 8 illustrate the advances made by the present invention in terms of the quantities of air aspirated and the specific power consumption, they do not provide any graphic representation of the favorable influence of the invention on the actual quality of the aeration, i.e. the bubble sizes achieved and the uniformity of their distribution, respectively. While absolute means of measuring these factors are still under development, a practical method of evaluating them which has been practiced for years has been to judge the quality of aeration by means of measurements of the yield of acetic acid in vinegar fermentations carried out with different aeration devices. This approach has been universally deemed fully justified by virtue of the fact that the Acetobacter which oxidize ethyl alcohol to acetic acid are extremely sensitive to even a very short lack of oxygen. Thus, a non-uniform distribution of the air bubbles results in lower acidification rates and lower maximum acidity, and as both the alcohol starting material and the acetic acid products are very volatile, any delay in fermentation results in a lower yield (100 percent = theoretical yield) which signifies a lesser quality of the aeration.

In the light of the foregoing considerations, i.e. that fermentation experiments can be carried out with different aeration devices so as to obtain comparative results, and in light of the facts that vinegar fermentations need an aeration rate of about 0.06 – 0.07 v/v/min (volume of air per volume of liquid per minute) and that in larger systems characterized by greater container diameters and higher liquid columns above the aerating device the latter must aerate a greater volume of liquid, the invention is still further illustrated by the following examples.

EXAMPLE 1

An aeration device according to British Patent No. 724,791 was mounted in a 2.2 m diameter tank or container near the bottom thereof. The device included a six-vaned rotor or impeller according to FIG. 8 of the patent, and a surrounding stator according to FIG. 4 of the patent. The rotor was carried by a long hollow drive shaft extending upwardly therefrom and driven at a speed of 1,450 rpm by a motor mounted at the top of the container. The stator was constructed with eight vertical guide plates between two flat rings which extended in over the rotor and covered the same to the extent of about 50 percent of its horizontal surfaces. The eight vertical guide plates were oriented non-radially of the rotor in the direction of rotation thereof, each so as to make an angle of 30° with a radial plane which includes the outer edge of that guide plate (corresponding to an angle of 58° with a radial plane which includes the inner edge of that guide plate). The locus of the inner edges of the guide plates was at a spacing of 6 mm from the locus of the outer edges of the impeller vanes. Other data as to details of both the construction and operation of the system and the results of a fermentation run performed therewith are set forth in column 1 of Table 1.

EXAMPLE 2

An aeration device according to the present invention was mounted in a 2.2 m diameter container near the bottom thereof. The device included a six-vaned rotor according to FIG. 2 of the instant application carried by a rotatable shaft extending into the container from below, and a surrounding stator. The shaft was an extended motor shaft driven at 1,450 rpm by a motor mounted below the container. A stationary air intake pipe extended up from the rotor to the atmosphere, the connection of the rotor to the air pipe being sealed by a labyrinth packing. The vane apex angle of the rotor was 40°. The stator had upper and lower rings which did not cover any part of the rotor but had an outer diameter 1.67 times the maximum outer diameter of the rotor, and 12 vertical guide plates between the rings, the locus of the inner edges of the guide plates as well as the inner edges of the rings being at a spacing of 0.75 mm from the locus of the outer edges of the vanes of the rotor. The guide plates were oriented non-radially of the rotor in the direction of rotation thereof, each so as to make an angle of 30° with a radial plane which includes the inner edge of that guide plate. Other data are set forth in column 2 of Table 1.

EXAMPLE 3

An aeration device according to the present invention was mounted in a 4.0 m diameter container near the bottom thereof. The device included a six-vaned rotor according to FIG. 3 of this application carried by a rotatable shaft extending into the container from below, and a surrounding stator. The shaft for driving the rotor, its operating speed, and the arrangement of the motor and the stationary air intake pipe were the same as in Example 2. The rotor carried on its outer periphery an upper and a lower ring each having an outer diameter equal to the diameter of the locus of the outer edges of the rotor vanes and an inner diameter 13 percent smaller than said outer diameter. The vane apex angle of the rotor was 30°. The stator again had upper and lower rings which did not cover any part of the rotor and the outer diameter of which was 1.67 times the rotor diameter, but there were 16 vertical guide plates between the rings. The spacing of the locus of the inner edges of the guide plates and of the stator rings from the locus of the outer edges of the rotor vanes, and the angular orientation of the vertical stator guide plates were again the same as in Example 2. Other data are set forth in column 3 of Table 1.

amounts of air (50 cbm/hr) in the one case, and for a four-fold greater amount of air in a container of almost twice the diameter and one-third greater liquid height in the other case. These data also clearly prove that the rotor of the prior art deivce must be substantially greater (with all the attendant disadvantages that entails) than any rotor according to the present invention in order to be able to aspirate the same quantity of air under both equivalent and greater liquid heights and that it could do so only through a far greater specific power consumption.

The following additional examples are presented to illustrate the invention further as applied to larger aeration units which are used for purposes where the aeration rate must be higher, e.g. in yeast fermentations where it is in the range of 0.5 v/v/min.

EXAMPLE 4

An aerating device according to the present invention was mounted in a container in the same fashion as in Examples 2 and 3, i.e. utilizing a six-vaned bottom-mounted rotor of the type shown in FIG. 2 and driven at 1,450 rpm in conjunction with a surrounding stator, but differing therefrom in that the vane apex angle was Table 1

|  | 1 | 2 | 3 |
|---|---|---|---|
| Inner diameter of container in mm | 2200 | 2200 | 4000 |
| Outer rotor diameter in mm | 300 | 180 | 270 |
| Diameter ratio | 1/7.3 | 1/12 | 1/14.8 |
| Filling height in mm | 3000 | 3200 | 4100 |
| Aspirated air quantity in cbm/hr | 50 | 50 | 200 |
| Aeration rate in v/v/min | 0.073 | 0.068 | 0.065 |
| Power consumption in kw | 6.0 | 4.0 | 17.0 |
| Specific power consumption in kwh/10 cbm of air | 1.2 | 0.8 | 0.85 |
| In vinegar fermentations: |  |  |  |
| Maximum acidification rate in % acetic acid per hour | 0.10 | 0.15 | 0.15 |
| Maximum acetic acid concentration reached in % | 10.1 | 13.7 | 13.5 |
| Yield of acetic acid in % | 90 | 97 | 96 |
| Average fermentation efficiency in liters alcohol fermented per 24 hours | 240 | 343 | 1360 |
| Specific power consumption to ferment 100 liters of alcohol in kwh | 60 | 28 | 30 |

The superiority of the aerating devices according to the present invention over that disclosed in British Patent No. 724,791 will be readily apparent from the data in Table 1. Thus, with respect to the vinegar fermentation, both Examples 2 and 3 show the attainment of an acidification rate 50 percent higher than that of Example 1 and a maximum acetic acid concentration about 35 percent higher than that of Example 1, and they also show that relatively high yields (on the order of 96 percent and 97 percent) of acetic acid are obtained in comparison with relatively low commercial yield of 90 percent which resulted from the run according to the British patent, thereby providing solid evidence of the higher quality of the aeration. Example 3 further shows the possibility of scaling vinegar fermenters up to a liquid volume of 51,500 liters with equally good results. On the other hand, with respect to the operation of the various devices as such, Examples 2 and 3 show the attainment of a one-third reduction in specific power consumption over that of Example 1, for equal 35°, and in that the stator, the upper and lower rings of which again did not cover any part of the rotor, had 28 vertical guide plates oriented at angles of 30° with respective radial planes including the inner edges of the guide plates. Other data as to the construction and a yeast production run are set forth in column 4 of Table 2.

EXAMPLE 5

An aerating device according to the present invention was mounted in a container in the same fashion as in Example 4 but using a different rotor and stator combination. The rotor was a six-vaned, enlarged-chamber rotor of the type shown in FIG. 5, with the vertical impeller surface of each vane being curved so as to make at every generatrix along its length an angle between 53° and 60° with a vertical radial plane which includes that generatrix. The rotor was driven at 1,450 rpm. The stator had 34 vertical guide plates between the upper and lower rings the outer diameter of which was again 1.67 times the maximum outer diameter of the rotor, and the locus of the inner edges of the guide plates and of the rings was at a spacing of 1.00 mm from the locus of the outer edges of the rotor vanes. Other data are set forth in column 5 of Table 2.

EXAMPLE 6

An aeration device according to the present invention was mounted in a container in the same fashion as in Example 5, being identical thereto in all aspects of construction and operating conditions except for the upper and lower rings of the stator which were extended outward by means of added horizontal guide sheets or plates with an outer diameter 2.8 times the maximum outer diameter of the rotor. Other data are set forth in column 6 of Table 2.

ment of the aerating device employed which, though having its genesis in the aerating device disclosed in British Patent No. 724,791, differs substantially therefrom in a number of basic features (i.e. the specified rotor to container diameter ratio, the specified constructions of the rotor and the stator and the spacing of the stator from the rotor, the specified location of the rotor in the container and its being driven by a short extended motor shaft entering the container from below, and the provision of the specified labyrinth packing between the top of the rotor and the upwardly extending stationary air intake pipe) that in their totality and cooperative interrelationships are critical to the attainment of the said results.

Although the aerating devices according to the present invention are primarily designed for, and preferably Table 2

|  | 4 | 5 | 6 |
|---|---|---|---|
| Inner diameter of container in mm | 3000 | 3700 | 3700 |
| Outer diameter of rotor in mm | 340 | 430 | 430 |
| Diameter ratio | 1/8.8 | 1/8.6 | 1/8.6 |
| Filling height in mm | 4000 | 4000 | 4000 |
| Aspirated air quantity in cbm/hr | 590 | 1320 | 1750 |
| Aeration rate in v/v/min | 0.35 | 0.51 | 0.68 |
| Power consumption in kw | 61 | 104 | 120 |
| Specific power consumption in kwh/10 cbm of air | 1.03 | 0.79 | 0.69 |
| In yeast production: |  |  |  |
| Produced amount of wet yeast within 13 hours in kg | 2,500 | 5,000 | 6,500 |
| Specific power consumption in wh/kg wet yeast | 200 | 180 | 170 |
| Average air consumption in cbm per kg wet yeast | 2.2 | 2.0 | 1.9 |

Table 2 clearly shows the advantages gained by using a rotor with curved vertical impeller surfaces and enlarged impeller chambers in comparison to a rotor with rectilinear vertical impeller surfaces, and by using a stator with rings laterally extended by means of horizontal annular guide plates in comparison to a stator with unextended guide rings. With respect to yeast production, furthermore, as was pointed out in our prior application Ser. No. 828,695, the best aeration unit known to us for this purpose is one of the type disclosed in German Patent No. 1,071,024 (corresponding to U.S. Pat. No. 3,066,921) which, operating with a blower to introduce air into a container of 3.7 m diameter filled with liquid to a height of 4.0 m, requires on the average between 2.8 and 6.2 cbm of air per kg of yeast produced. By way of contrast, Table 2 shows that an aeration unit utilizing any of the aerating devices according to the present invention requires over 20 percent less air per kg of yeast produced than even the most efficient and economical unit of the prior art and about 65 percent less than the least economical unit. Table 2 thus provides additional evidence of the technological and economic advances accruing from the present invention.

It will be seen, therefore, that the present invention provides a self-aspirating apparatus for the aeration of liquids which is capable of producing results, in terms of capacity, efficiency and economy of operation as well as in terms of the quality of aeration attainable, that far exceed anything heretofore achieved by prior art units. As will further be seen, these surprisingly and unexpectedly favorable results are essentially due to the herein described special construction and arrangewill be used in, the aeration of fermentation liquids or waste water, they are equally applicable to the practice of all gas-liquid reactions whether or not the liquid is water or the gas is air. Moreover, the devices are not limited to aspirating atmospheric pressure air, but can be used for such gas-liquid reactions as are carried out under higher pressure than atmospheric. In that case, however, the gas supply must be maintained under about the same pressure as exists in the reaction vessel or container. In no event, of course, is the air or gas to be blown into the container under a pressure than that existing in the container. Merely by way of example, due to their ability to produce the finest size bubbles as well as a uniform distribution of the gas in the liquid, the aerating devices according to the present invention have already been used for such processes as ozonation of water, hydrogenation of organic components in aqueous solution, and oxidation of inorganic salts in aqueous solution with pure oxygen.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

We claim:

1. A self-aspirating device for the aeration of liquids with air of atmospheric pressure in a vertically disposed cylindrical container having a predetermined internal diameter, comprising: a rotatable extended motor shaft extending upwardly into said container from below the latter; a motor located exteriorly of said container for driving said shaft in a predetermined direction of rotation; a hollow rotor arranged within said container near the bottom of the latter and carried by said shaft for rotation therewith, said rotor having vertically spaced horizontal top and bottom surfaces and four to eight peripherally spaced vertical impeller surfaces intermediate said top and bottom surfaces and extending from one to the other of the latter, each of said vertical impeller surfaces being oriented non-radially of said rotor away from the direction of rotation thereof and defining, in conjunction with corresponding sections of said top and bottom surfaces, a respective laterally projecting vane closed at its leading side and provided with a vertical air outlet opening at its trailing side, the maximum outer diameter of said rotor as measured at the locus of the apices of said vanes being between ⅛ and 1/15 of said internal diameter of said container; a stationary air intake pipe connected at one end to said rotor at said top surface thereof and extending therefrom out of said container, the connection between said rotor and said one end of said air intake pipe being sealed by a labyrinth packing, and the other end of said air intake pipe being in communication with the atmosphere; each of said vertical impeller surfaces defining in conjunction with the preceding one of said outlet openings as viewed in the direction of rotation of said rotor a respective impeller chamber which is open at the top and bottom thereof for admitting liquid thereinto from above and below, liquid so entering said impeller chambers being mixed therein with air aspirated into and exiting from the interior of said rotor via said outlet openings during rotation of said rotor, and the resultant mixture of air and liquid being propelled from said impeller chambers outwardly of said rotor toward the wall of said container; and a stator mounted in the bottom region of said container in surrounding relation to said rotor, said stator including upper and lower annular plates disposed at about the levels of said top and bottom surfaces of said rotor, respectively, and 12 to 36 vertical guide plates arranged at circumferentially spaced locations between said annular plates, said mixture of air and liquid emanating from said impeller chambers flowing outwardly between said annular plates and being additionally mixed and directed toward said wall of said container by said vertical guide plates; the inner diameter of both said annular plates being from 1 to 6 mm greater than said maximum outer diameter of said rotor, and the outer diameter of both said annular plates being at least between about 1.5 and 2 times said maximum outer diameter of said rotor; each of said vertical guide plates of said stator being oriented non-radially of said rotor in the direction of rotation thereof and making an angle of 25° to 35° with a respective radial plane which includes the inner edge of that guide plate; and the locus of said inner edges of said guide plates being at a 0.5 to 3 mm spacing from the locus of the apices of said vanes of said rotor.

2. An aerating device as claimed in claim 1, wherein the outer diameter of said annular plates of said stator is less than two times said maximum outer diameter of said rotor.

3. An aerating device as claimed in claim 2, said stator further comprising a pair of second annular plates secured to said first-named annular plates, respectively, and extending outwardly therefrom towards said wall of said container, the outer diameter of said second annular plates being between two and five times said maximum outer diameter of said rotor.

4. An aerating device as claimed in claim 1, wherein the outer diameter of said annular plates of said stator is between two and five times said maximum outer diameter of said rotor.

5. An aerating device as claimed in claim 1, said rotor further being provided with an upper ring and a lower ring secured to said top and bottom surfaces of said rotor in overlying relation to the outer peripheral region thereof, said rings both having an outer diameter equal to said maximum outer diameter of said rotor and an inner diameter which is between about 10 and 20 percent smaller than said outer diameter of said rings.

6. An aerating device as claimed in claim 1, each of said vertical impeller surfaces being rectilinear and oriented so as to make an angle between about 30° and 60° with a respective radial plane which includes the outermost edge of that vertical impeller surface.

7. An aerating device as claimed in claim 6, said rotor further being provided with an upper ring and a lower ring secured to said top and bottom surfaces of said rotor in overlying relation to the outer peripheral region thereof, said rings both having an outer diameter equal to said maximum outer diameter of said rotor and an inner diameter which is between about 10 and 20 percent smaller than said outer diameter of said rings.

8. An aerating device as claimed in claim 6, said vane-defining sections of said top and bottom surfaces of said rotor being recessed in from their trailing edges bounding said outlet openings, thereby to extend said impeller chambers of said rotor beyond the respective radial planes which include the outermost edges of said vertical impeller surfaces.

9. An aerating device as claimed in claim 1, each of said vertical impeller surfaces of said rotor being curved so as to make at every generatrix thereof along the length of that impeller surface an angle between about 40° and 70° with a respective vertical radial plane which includes that generatrix.

10. An aerating device as claimed in claim 9, said vane-defining sections of said top and bottom surfaces of said rotor being recessed in from their trailing edges bounding said outlet openings, thereby to extend said impeller chambers of said rotor beyond the respective radial planes which include the outermost edges of said vertical impeller surfaces.

11. An aerating device as claimed in claim 10, said stator further comprising a pair of second annular plates secured to said first-named annular plates, respectively, and extending outwardly therefrom toward said wall of said container, the outer diameter of said second annular plates being between two and five times said maximum outer diameter of said rotor.

* * * * *

PO-1050
(5/69)

UNITED STATES PATENT OFFICE
CERTIFICATE OF CORRECTION

Patent No. 3,813,086         Dated  May 28, 1974

Inventor(s)  HEINRICH EBNER ET AL.

It is certified that error appears in the above-identified patent and that said Letters Patent are hereby corrected as shown below:

Column 4, line 7, "misture" should read --mixture--.
Column 5, line 6, "therefor" should read --therefore--.
Column 10, line 58, "z0" should read --20--.  Column 16, line 45, "pressure than" should read --pressure higher than--.

Signed and sealed this 29th day of October 1974.

(SEAL)
Attest:

McCOY M. GIBSON JR.           C. MARSHALL DANN
Attesting Officer             Commissioner of Patents

UNITED STATES PATENT OFFICE
CERTIFICATE OF CORRECTION

Patent No. 3,813,086　　　　　Dated　May 28, 1974

Inventor(s)　Heinrich Ebner　et al.

It is certified that error appears in the above-identified patent and that said Letters Patent are hereby corrected as shown below:

On the cover sheet under the heading "Foreign Patents or Applications", lines 1 and 2 should read -- 724,791　　7/1965　Great Britain ------261/87

1,197,063　　2/1955　Germany-------------261/87 --.

Signed and sealed this 14th day of January 1975.

(SEAL)
Attest:

McCOY M. GIBSON JR.　　　　　C. MARSHALL DANN
Attesting Officer　　　　　　Commissioner of Patents